No. 760,263. PATENTED MAY 17, 1904.
F. SIEMENS.
REGENERATIVE GAS FURNACE.
APPLICATION FILED AUG. 11, 1902.
NO MODEL. 2 SHEETS—SHEET 1.

Witnesses:
Inventor
Frederick Siemens
By James L. Norris.
Atty

No. 760,263. PATENTED MAY 17, 1904.
F. SIEMENS.
REGENERATIVE GAS FURNACE.
APPLICATION FILED AUG. 11, 1902.
NO MODEL. 2 SHEETS—SHEET 2.

Figure 8:
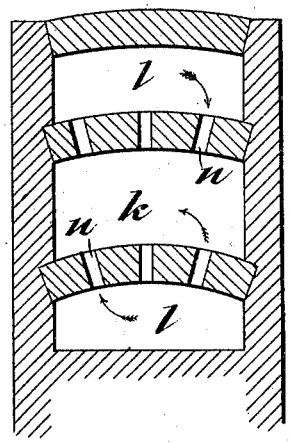
Figure 8:
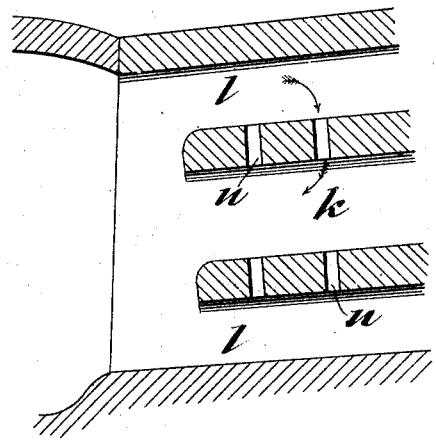

*Fig. 8.ª*

Witnesses:

Inventor
Frederick Siemens
By James L. Norris.
Atty

No. 760,263. Patented May 17, 1904.

UNITED STATES PATENT OFFICE.

FREDERICK SIEMENS, OF DRESDEN, GERMANY.

REGENERATIVE GAS-FURNACE.

SPECIFICATION forming part of Letters Patent No. 760,263, dated May 17, 1904.

Application filed August 11, 1902. Serial No. 119,350. (No model.)

*To all whom it may concern:*

Be it known that I, FREDERICK SIEMENS, a subject of the King of Saxony, residing at 4 Liebigstrasse, Dresden, in the Empire of Germany, have invented a certain new and useful Improvement in Regenerative Gas-Furnaces, (for which I have applied for a patent in Great Britain, dated January 10, 1902, No. 770,) of which the following is a specification.

In the specifications to United States Patents Nos. 590,864 and 624,388 are described regenerative gas-furnaces having their gas-producers in close proximity to the furnace-chambers or in the same structures with them and provided with both gas and air reversing-valves. Usually the gas as it is evolved from these producers is at a comparatively low temperature. Sometimes, however, it is necessary or advantageous to supply the gas to the furnace at a temperature higher than that at which it emerges from the producers.

The present invention relates to means of increasing the temperature of the gas as it passes from the producers to the furnace, and this is accomplished in the following manner: The gas after passing from the producers through the controlling-valve passes along a gas port or flue which runs parallel or near to the flue that conducts highly-heated air from the regenerative-chamber to the furnace. At one or more parts of the gas-flue, and preferably near to the furnace-chamber itself, one or more holes are made through the flue-wall, so that streams of hot air can enter the gas-flue and mix with portions of the gas, creating a flame or flames by which the temperature of the main body of the gas is raised on its way to the furnace. Usually the hot air is at a higher pressure than the gas, so that the air passes in jets into the gas-flue. If, however, it should happen that the gas is at a higher pressure than the air, jets of gas can issue from the gas-flue and form flames in the air-flue, thus raising the temperature of the main body of the air before it reaches the furnace-chamber.

Figures 1 to 8ª show various arrangements of intercommunicating air and gas flues for heating the gas after it has passed the gas-valve or the air after it has passed the air-valve and before it enters the furnace-chamber.

Figure 1:
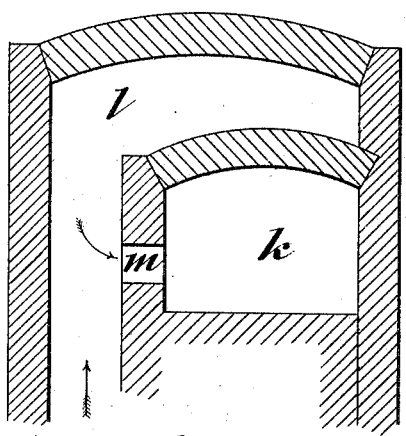
Figure 2:
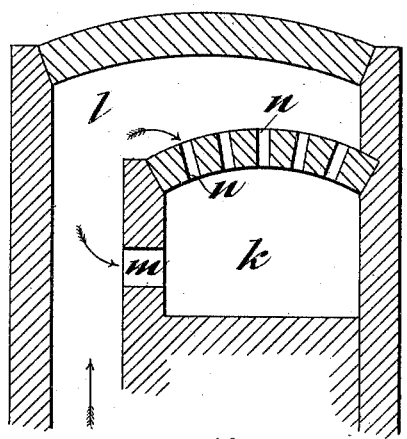
Figure 3:
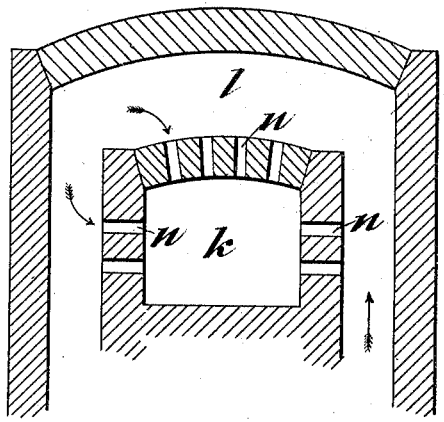
Figure 4:
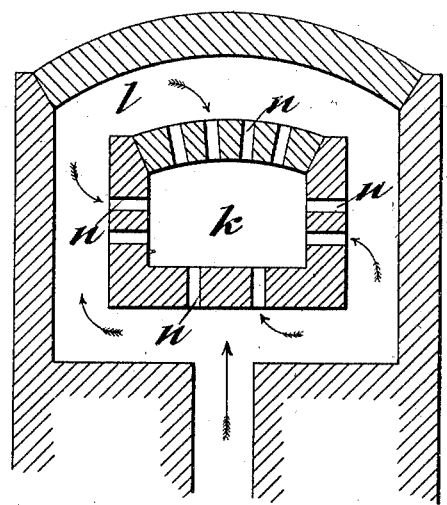

Fig. 1 shows a cross-section through the gas-flue $k$ and the air-flue $l$, leading to the heating or melting chamber. There are one or more openings $m$ formed in the side wall of the gas-flue $k$, through which a portion of the highly-heated-air supply coming from the regenerators passes in among the gas-supply, the air-supply being at a somewhat higher pressure than the gas-supply. The resulting combustion of the entering jets of air with a portion of the gas has the effect of heating the main body of the gas to the required higher degree before it enters the heating or melting chamber. Should the pressure of the gas-supply be greater than that of the air-supply, jets of gas enter the air-flue, and the resulting combustion of the gas with a portion of the air heats the main body of the air to a higher temperature before it enters the heating or melting chamber. In Fig. 2 the highly-heated air enters the gas-flue $k$ through several small openings $n$ at the top through one or more openings in the side of the gas-flue. In Fig. 3 the air enters through openings $n$ on three sides of the gas-flue, while in Fig. 4 the inlet-openings $n$ are provided on all four sides thereof.

Figure 5:
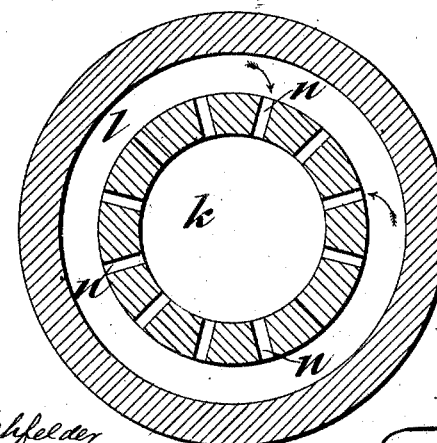
Figure 6:
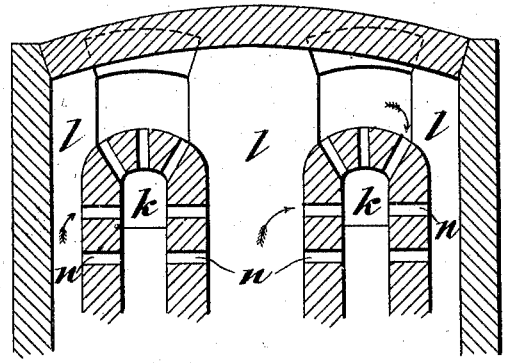
Figure 7:
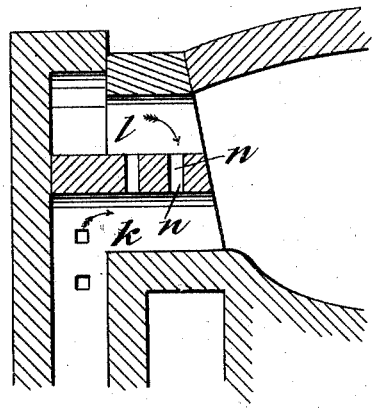

Fig. 5 shows a cylindrical air-flue $l$, with a concentric cylindrical gas-flue $k$ inside, having openings arranged all round it. In the arrangement shown in cross-section in Fig. 6 and part longitudinal section in Fig. 7 there are two gas-flues $k$ $k$, surrounded by the air-flue $l$ and communicating therewith by means of openings $n$ $n$ on both sides and at the top, while in the arrangement shown in cross-section in Fig. 8 and longitudinal section in Fig. 8ª the gas-flue $k$ communicates through openings $n$ with the air-flues $l$ $l$, arranged above and below the same.

Having thus described the nature of this invention and the best means I know of carrying the same into practical effect, I claim—

1. In a regenerative gas-furnace, means for increasing the temperature of the producer-gas, said means consisting of a gas-flue and an air-flue for conducting highly-heated air, the wall of one flue forming the dividing-walls between the flues, said flues communicating with each other at intervals throughout their length by ports in the dividing-wall through which a portion of the contents of one flue may issue into the other flue and combining with a portion of the contents thereof produce flames by which the said contents are heated, substantially as described.

2. In a regenerative gas-furnace, means for increasing the temperature of the air supplied thereto, said means consisting of a gas-flue and an air-flue for conducting highly-heated air, the wall of one flue forming the dividing-wall between the flues, said flues communicating with each other at intervals throughout their length by ports in the dividing-wall through which a portion of the contents of the gas-flue may issue into the air-flue and combining with a portion of the contents of the air-flue produce flames by which the temperature of the air in the air-flue will be increased, substantially as described.

3. In a regenerative gas-furnace, means for increasing the temperature of the producer-gas, said means consisting of a gas-flue and an air-flue surrounding said flue and adapted to conduct highly-heated air, the wall of the gas-flue forming the dividing-wall between the gas and air flues, said flues communicating with each other at intervals, throughout their length, by ports in the dividing-wall through which a portion of the contents of one flue may issue into the other flue and combining with a portion of the contents thereof produce flames by which the said contents are heated, substantially as described.

4. In a regenerative gas-furnace, means for increasing the temperature of the producer-gas, said means consisting of a gas-flue and an air-flue for conducting highly-heated air, the wall of one flue forming the dividing-wall between the flues, said flues communicating with each other at intervals throughout their length by ports in the dividing-wall through which a portion of the contents of one flue may issue into the other flue and combining with a portion of the contents thereof produce flames by which the said contents are heated, and a gas-valve connected to the gas-flue at a point beyond the said ports in the dividing-wall of the flues, substantially as described.

In testimony whereof I have hereunto set my hand in presence of two subscribing witnesses.

FREDERICK SIEMENS.

Witnesses:
FRANZ RICHARD HERTEL,
PAUL E. SCHILLING.